(12) United States Patent
Janichek, Jr. et al.

(10) Patent No.: US 8,397,914 B1
(45) Date of Patent: Mar. 19, 2013

(54) HEAT SHRUNK, MANUALLY OPENABLE FLEXIBLE FILM PACKAGE

(71) Applicants: Daniel Frank Janichek, Jr., Neenah, WI (US); Brian Joseph Conrad, Appleton, WI (US); Christopher Wayne Nimis, Oshkosh, WI (US); Matthew Christopher Peterka, Neenah, WI (US)

(72) Inventors: Daniel Frank Janichek, Jr., Neenah, WI (US); Brian Joseph Conrad, Appleton, WI (US); Christopher Wayne Nimis, Oshkosh, WI (US); Matthew Christopher Peterka, Neenah, WI (US)

(73) Assignee: Curwood, Inc., Oshkosh, WI (US)

( * ) Notice: Subject to any disclaimer, the term of this patent is extended or adjusted under 35 U.S.C. 154(b) by 0 days.

(21) Appl. No.: 13/649,718

(22) Filed: Oct. 11, 2012

(51) Int. Cl.
*B65D 85/00* (2006.01)

(52) U.S. Cl. .......................... 206/497; 220/260; 426/415

(58) Field of Classification Search .................. 206/497, 206/557, 564, 524.8; 220/260; 426/411, 426/413, 414, 415; 428/36.6, 347
See application file for complete search history.

(56) References Cited

U.S. PATENT DOCUMENTS

| | | | |
|---|---|---|---|
| 3,641,732 A | | 2/1972 | Fujio |
| 3,942,676 A | * | 3/1976 | Beckers et al. ............... 220/270 |
| 5,631,036 A | * | 5/1997 | Davis ............................ 426/396 |
| 5,779,050 A | * | 7/1998 | Kocher et al. ................. 206/497 |
| 5,916,615 A | * | 6/1999 | Brady et al. ................... 426/129 |
| 7,487,625 B2 | * | 2/2009 | Natterer et al. ................. 53/433 |
| 2008/0128416 A1 | | 6/2008 | Odabashian |
| 2008/0160143 A1 | * | 7/2008 | Edwards et al. ............. 426/129 |
| 2009/0116768 A1 | | 5/2009 | Huerta et al. |

* cited by examiner

*Primary Examiner* — Jacob K Ackun
(74) *Attorney, Agent, or Firm* — Tom J. Hall (57) ABSTRACT

The present disclosure is concerned with heat shrunk sealed packages of flexible transparent thermoplastic film that easily opened by peeling. It involves lowering the peel strength of the heat seal between the two films used to form the package by providing one of them with a frangible layer by contaminating a layer with an incompatible polymer and providing a set of graspable tabs, one on each of the films, with which to initiate peeling of the heat seal. The tabs are heat set so that they do not shrink with the rest of the package. In a preferred embodiment, the package is provided with a second heat seal just inside the perimeter of the first and a stress concentrator, which may be a chevron, at the juncture of heat set tabs which lie with one atop the other with the first heat seal.

20 Claims, 6 Drawing Sheets

HEAT SHRUNK, MANUALLY OPENABLE FLEXIBLE FILM PACKAGE

SUMMARY OF THE INVENTION

The present invention is concerned with improved heat shrunk packages formed from a first flexible heat shrinkable film and a second flexible heat shrinkable film, and having a hermetic seal comprising a heat seal formed by heat sealing a portion of the second flexible heat shrinkable film to a portion of the first flexible heat shrinkable film; wherein only one of the heat shrinkable films is readily frangible and renders the heat seal manually peelable. The inventive packages also include a heat set tab on each of the two heat shrinkable films which are aligned with each other such that each of the tabs has a sufficient surface area facing the other tab but not adhered to it to render each tab readily manually graspable. A portion of each of the tabs immediately adjacent to the heat seal is adhered to the other and the adhered portion includes a feature which concentrates stress on the heat seal when the tabs are pulled away from each other in a direction generally perpendicular to the plane of the heat seal. The graspable tabs are adapted to pull away from each other such that the readily frangible film cleanly peels apart from itself to rupture the heat seal and open the package.

The tabs are conveniently provided by heat setting aligned portions of the two films which lie outside the heat seal which joins them to each other and provides the hermetic seal. These portions are heat set by constrained annealing before the package is subjected to shrinking in manner that avoids their adhering to each other and are of a sufficient size as to be readily graspable. In a preferred embodiment the surface of at least one of these two portions which faces the other film is treated to render it non-adherent. One approach is the print this surface with an ink and another is to apply a label to this surface. Alternatively, a heat resistant material which will not fuse to either of the facing surfaces may be inserted between them or a heat set temperature may be utilized which is below the temperature at which the two facing surfaces are rendered adhesive.

The heat seal is conveniently rendered more amenable to peeling by using two multilayer films where only one of the films is frangible and provides at least one frangible layer, by which is meant a film layer which has been designed to be particularly susceptible to fracture. In a preferred embodiment the frangible layer of the frangible film is adjacent to the exterior layer which participates in the formation of the heat seal. In a particularly preferred embodiment the frangible layer is formed by contaminating the polymer which forms the structure of this layer with an incompatible polymer. In a particularly preferred embodiment the frangible layer is a tie layer.

In a preferred embodiment the hermetic seal is made more secure by creating a second heat seal which is adjacent to and is entirely surrounded by the first heat seal. The aim is to provide a means of isolating the first heat seal from some of the stresses encountered when the films are shrunk on to the packaged item or items.

In a preferred embodiment the first heat seal is rendered more peelable by providing a stress concentrator immediately adjacent to the first heat seal in the vicinity of where the two tabs join each other and distal from the free ends of these tabs. In a particularly preferred embodiment the stress concentrator is a feature formed as an extension of the first heat seal located where the tabs join one another. In an especially preferred embodiment the stress concentrator is a chevron with its apex directed away from the first heat seal. It is also possible to form the stress concentrator by allowing a properly configured area of the two tabs adjacent to the first heat seal to adhere or fuse together. The aim is to lower the force needed to cause an initial fracture of the first heat seal and thus facilitate the peeling apart of this heat seal.

DETAILED DESCRIPTION OF THE INVENTION

Figure 1:
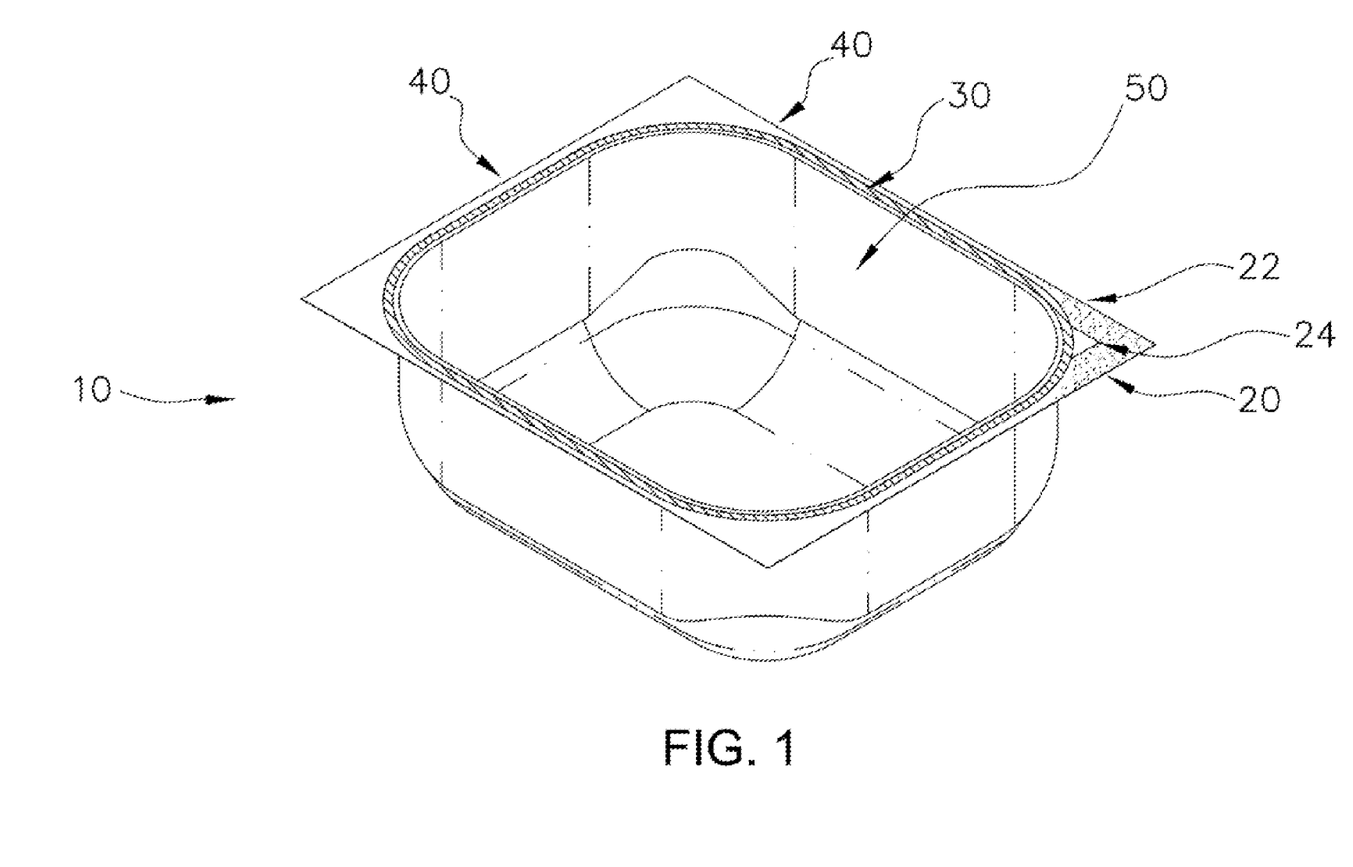
FIG. 1 is a perspective view of the molded container 10 showing the projected corner 20 with its ink overprint 22 with its ink free projected stress concentrator location 24, the sealing gasket 30 which facilitates the vacuum forming, the projected cut line 40 along which the container will be separated from the web stock (not illustrated) out of which the container is thermoformed and the interior of the container 50.
Figure 2:
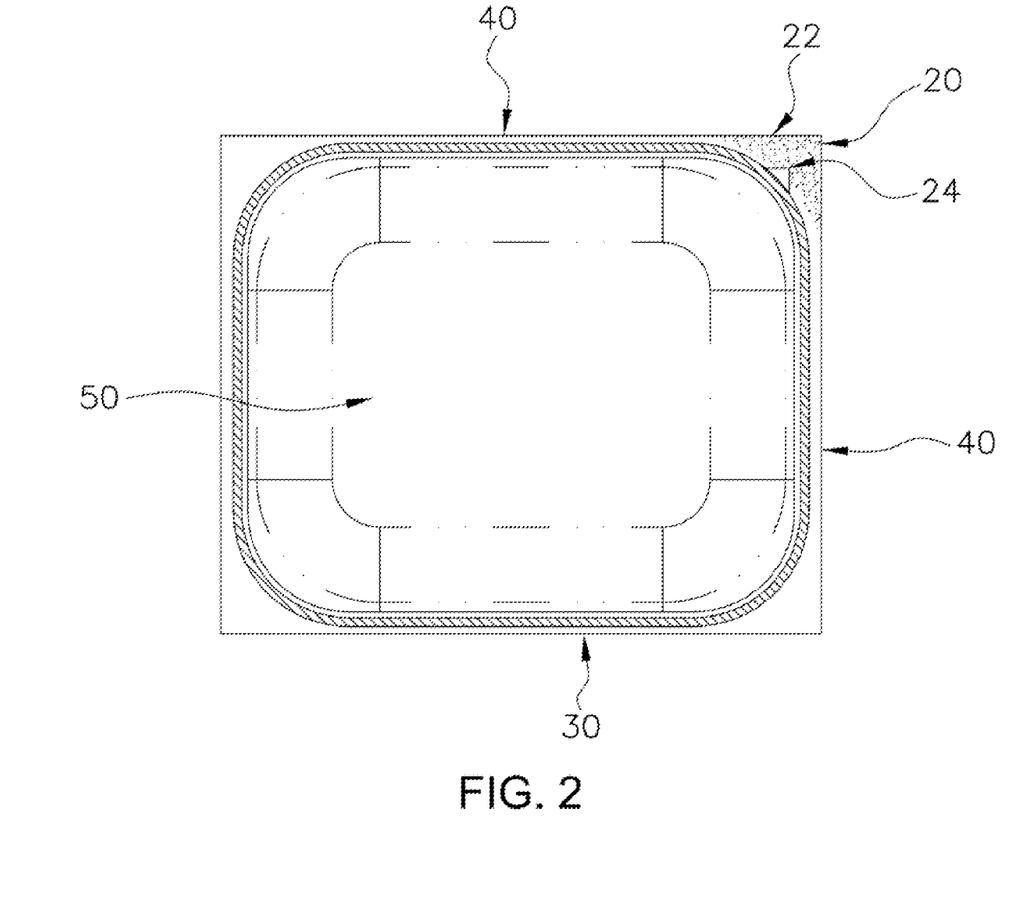
FIG. 2 is a plan view of the molded container 10 with the same elements carrying the same numerical indicators.

The film package with which the present invention is concerned may be conveniently manufactured by first forming the molded container 10 shown in FIGS. 1 and 2 by hot drawing constrained web stock into a mold equipped with a gasket 30 to help maintain the vacuum used to draw the web stock into a mold to form the interior 50. Later in the process this molded container 10 will be separated from the web stock from which it is formed along the projected cut line 40. This will create projected corner 20. The portion of the web stock which will become the projected corner 20 has been treated with an ink overprint 22 such that when it is later brought into contact with another web stock under heat and pressure it will not adhere to said other web stock. However, the ink overprint has been omitted from a triangularly shaped stress concentrator location 24 located within the projected corner 20. The molded container is then filled with the desired article, typically a meat or cheese product, by placing it in the interior 50.

Figure 3:
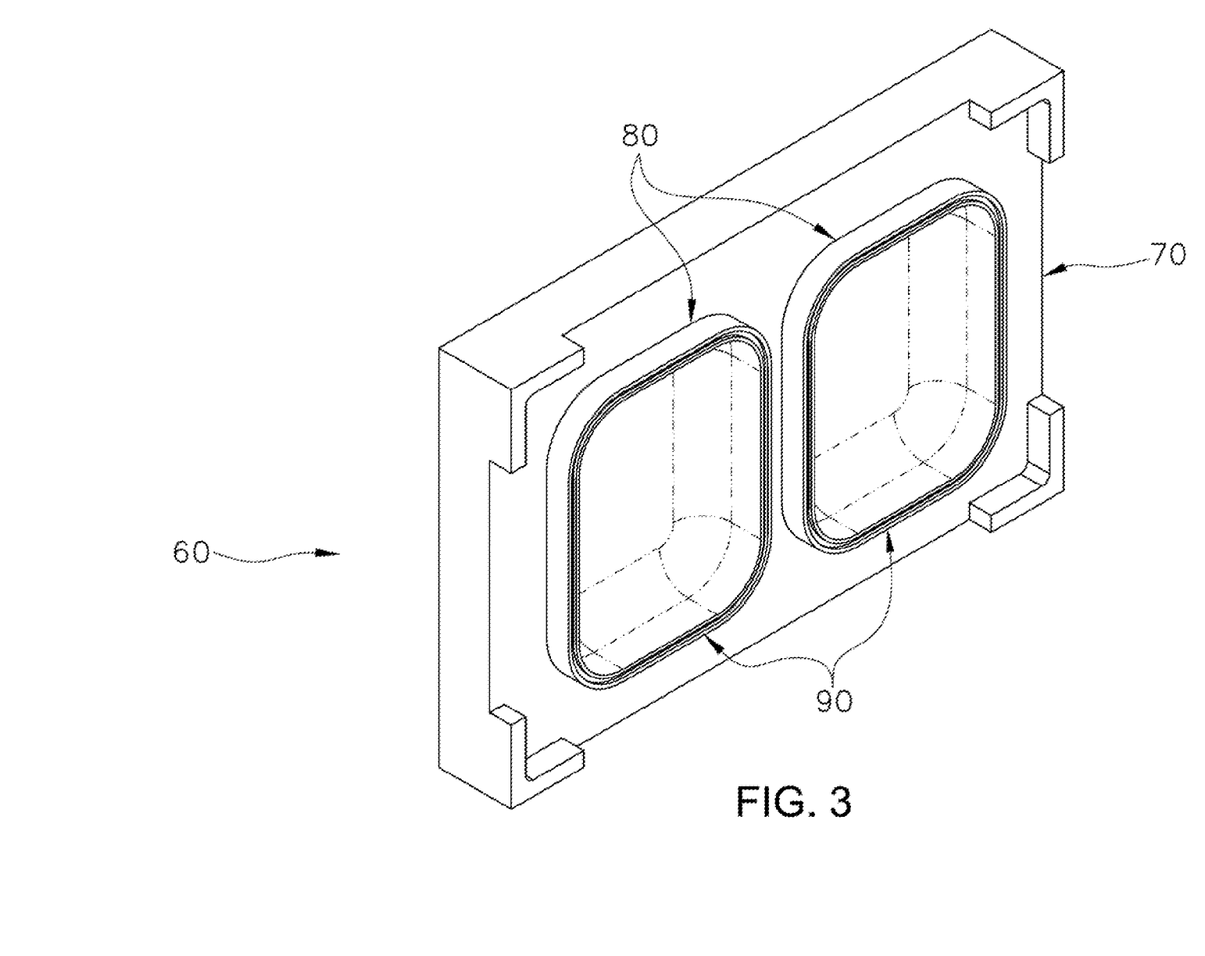
FIG. 3 is a perspective view of the hest sealing apparatus 60 including an upper mold carrier 70 which has two seal bar carriers 80 which each carries seal bars 90 and a dog bone shaped movable heatable platen 98.
Figure 4A:
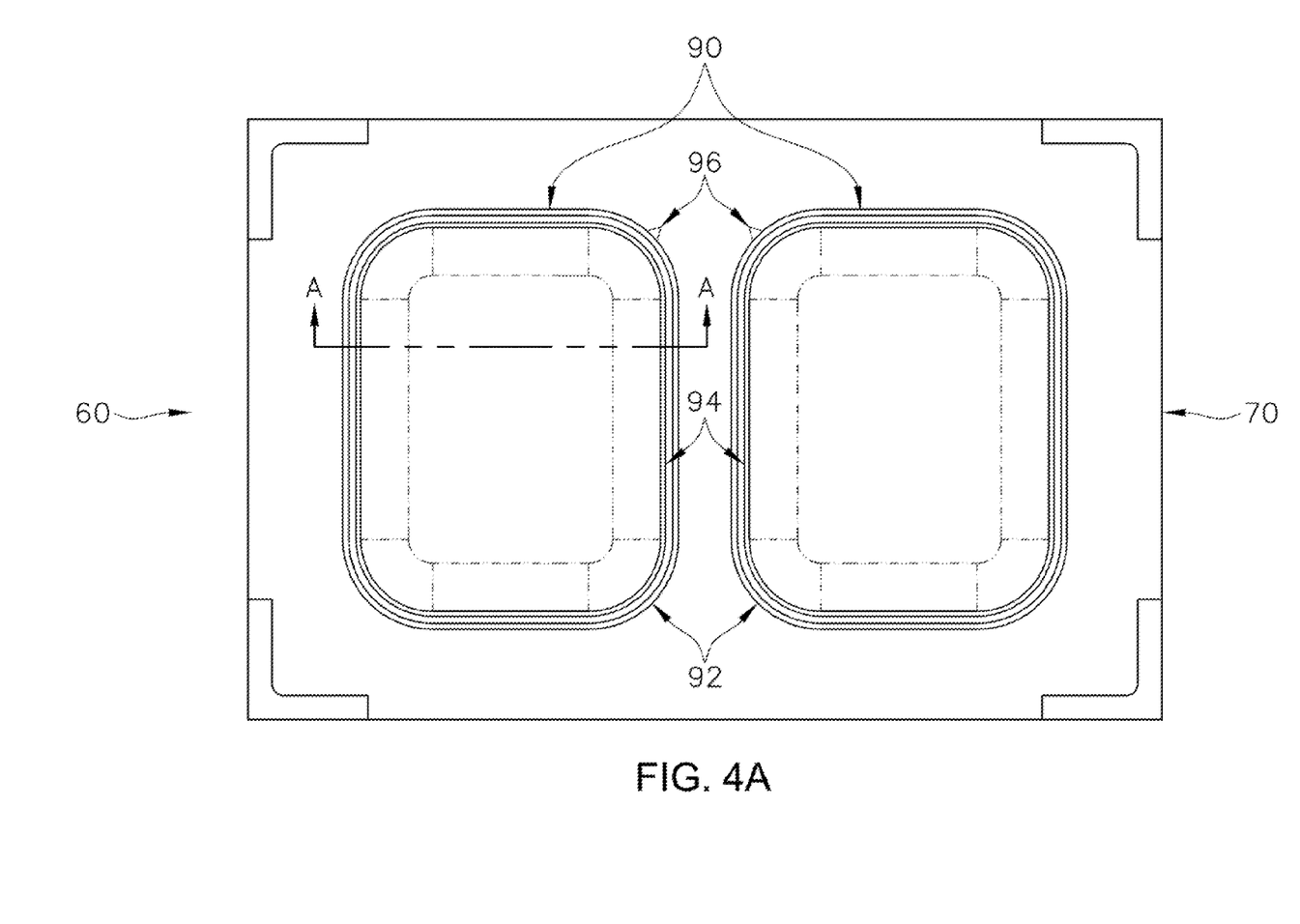
FIG. 4A is a plan view of the heat sealing apparatus 60 with the same elements carrying the same numerical indicators. Additionally illustrated are the outer seal bar 92, the inner heat seal bar 94 and the stress concentrator profile 96.

The open mouths of two side by side molded containers are sealed by heat sealing a portion of a web stock caused to overlay these open mouths using the seal bars 90 carried by the seal bar carriers 80 which are in turn carried by the upper mold carrier 70 which is the operative portion of the heat sealing apparatus 60 as shown in FIGS. 3 and 4A. The projected corner 20 of each molded container 10 and a corresponding portion of the overlaying web stock are heat set by the overlaying web stock being contacted by the heatable platen 98 and the heat transferring into the projected corners 20. The ink overprint 22 prevents the corresponding portions of the overlaying web stock from fusing or adhering to the projected corners 20 despite their facing surfaces being forced together at an elevated temperature.

Figure 4B:
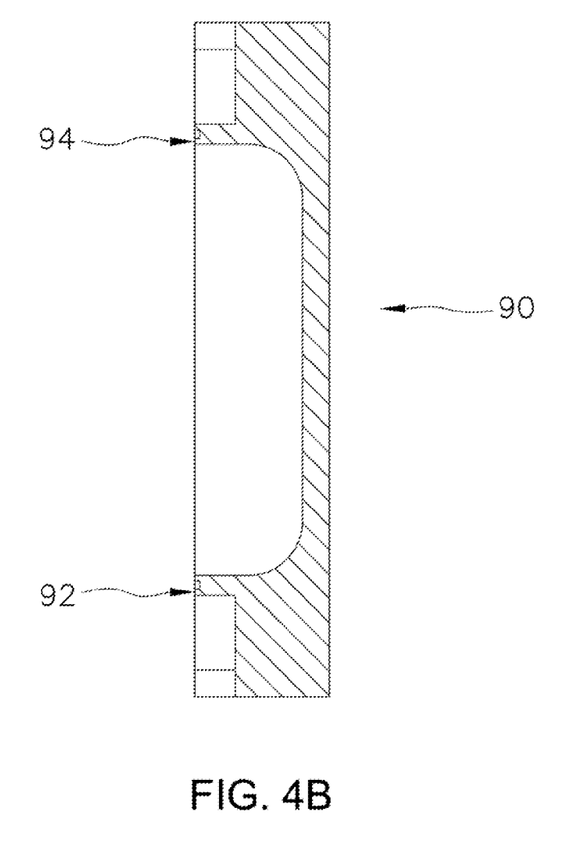
FIG. 4B is a cross-section of a seal bar carrier 90 along line A-A with the same elements carrying the same numerical indicators.

As can be seen in FIG. 4A and FIG. 4B, the heat seal bars 90 are made up of outer seal bars 92 and inner seal bars 94. As can be seen in FIG. 4A the outer seal bars 92 each carry a stress concentrator profile 96 which mates with the stress concentrator location 24 and creates a stress concentrator 106 by fusing the corresponding portion of the overlying web stock to the stress concentrator location 24. In essence a triangular shaped projection with its apex pointed outward is formed on each the heat seals formed by the outer seal bars 92.

Figure 5:
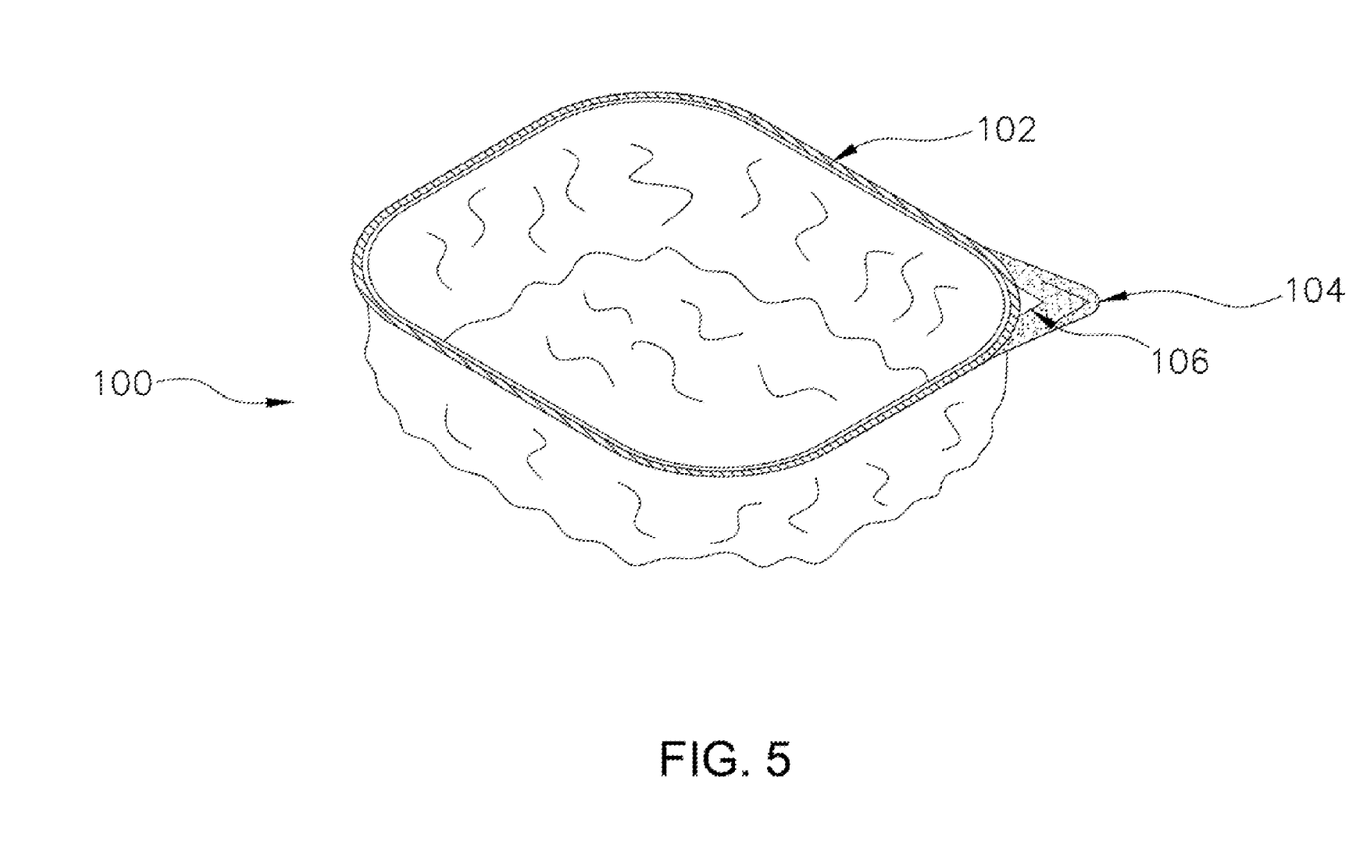
FIG. 5 is a perspective view of the sealed package 100 showing the heat seals 102, the heat set tabs 104 and the stress concentrator 106 formed by the stress concentrator profile 96.

After the open mouth of the molded container 10 is sealed by the action of the seal bars 90 to form the heat seals 102, the projected corner 20 and the corresponding portion of the overlying web stock have been heat set to form the heat set tabs 104 by the action of the movable heatable platen 98 and the stress concentrator 106 is formed by the action of the stress concentrator profile 96, the sealed package is separated from the two web stocks along the projected cut line 40 and subjected to elevated temperature to cause heat shrinking of the web stock which has not been heat set to yield the final easy open package illustrated in FIG. 5. The heat sealing is effected in a sealed chamber such that the interior of the molded container 50 is evacuated.

The films used to form the sealed package may be any thermoplastic films which are adapted for use in making sealed heat shrunk packages from cavities which are formed by hot stretching at least one of the films. Preferably one or both of the films will be essentially transparent. Both the films need to have an exterior layer which is heat sealable using industry acceptable conditions. It is preferred that they display an initial peak peel strength of at least about 2000 g/inch when sealed at 300° F. for 1 second at 30 psi. The term "initial peak peel strength" as used throughout this disclosure refers to the amount of force required to initiate the peeling or rupturing of a film from itself or to another film. In contrast, the term "propagation peel strength" as used throughout this disclosure refers to the amount of force required to maintain the peeling or rupturing of a film from itself or from another film after peeling has been initiated. In general, the initial peak peel strength will be higher than the propagation peel strength. Both of the films also need to have locked in stresses from their manufacture so that they will exhibit substantial shrinking when exposed to an appropriate elevated temperature. It is preferred that they exhibit shrink in both the machine direction (MD) and the transverse direction (TD) of at least about 20% when exposed to 90° C. It is particularly preferred that they display shrinkages of about 35% or more when exposed to 90° C. The first film needs to exhibit substantial stretchability at elevated temperatures. It is preferred that it sustain an increase in area of about 300% or greater at temperatures of about 80° C. or greater. It is convenient if the second film displays substantial stretchability at elevated temperatures to accommodate the packaging of particularly large items. It is preferred that both films be approved for food contact. It is also preferred that both films incorporate an oxygen barrier such as ethylene vinyl alcohol (EVOH) or polyvinylidene chloride (PVdC) as one of its layers. It is also preferred that the external layer opposite the heat seal layer be puncture and abuse resistant. The nylons known for use in wrapping and packaging films are particularly preferred for this purpose. An especially preferred film structure is Nylon/Tie/Nylon/EVOH/Nylon/Tie/Heat Sealable. Particularly suitable nylon layers, which are made from mixtures of crystalline and amorphous polyamides, are taught in U.S. Published Patent Application 2008/0113130 incorporated by reference herein. The heat sealable layer may be any of those conventionally employed to obtain heat seals in flexible packaging films through the application of elevated temperature and pressure. Layers based on lower density polyethylene homopolymers such as low density polyethylene (LDPE), very low density polyethylene (VLDPE) and ultra low density polyethylene (ULDPE) and copolymers with small amounts of α-olefins such as hexane or octane such as linear low density polyethylene (LLDPE) and metallocene catalyzed linear low density polyethylene (mLLDPE) by themselves or combined with ethylene vinyl acetate (EVA) are preferred. Particularly preferred are the heat seal layers taught by U.S. Pat. No. 8,039,070, incorporated by reference herein. It is preferred that the heat seal layer display a peak peel strength of at least about 3500 g/inch in ASTM F88 when sealed at 300° F. at 30 psi for one second.

One of the two films will have a frangible layer which promotes peelability. This layer may be the heat seal layer, though it is preferred that it be another layer, with an especial preference for this layer being immediately adjacent to the heat seal layer. It is preferred that the frangible layer be isolated from the heat seal operation so that its frangibility or peelability is not unduly effected by the heat sealing conditions and has fairly reproducible peelability despite the variations in heat sealing parameters which may be encountered across various packaging plants. This layer is typically rendered frangible by contaminating the polymer or polymers which make up its structure with an incompatible polymer. It is preferred to use a polyethylene based structural polymer contaminated with between about 10 and 40 wt. % polybutene. Particularly preferred frangible layers are described in U.S. Pat. No. 8,039,070. However, in the present invention it is preferred that the frangible layer also be the tie layer between the heat seal layer and the next adjacent layer rather than being interposed between the heat seal layer and a tie layer. In the particularly preferred overall film structure, there is a core EVOH oxygen barrier layer sandwiched between two nylon layers and a tie layer between the inner nylon layer and the heat seal layer. In this construction it is preferred to contaminate this tie layer, preferably with polybutene. It is preferred that this frangible layer lower the initial peak peel strength to less than about 3200 g/inch in ASTM F88 when sealed at 300° F. at 30 psi for one second. It is particularly preferred that the initial peak seal strength under these conditions be lowered to between about 2400 and 3200 g/inch by this frangible layer.

In the preferred film constructions there are one or more tie layers which promote adhesion between layers that typically do not adhere well to each other. These tie layers have a number of formulations, some of which are disclosed in U.S. Pat. No. 8,039,070. But a typical characteristic is the inclusion an anhydride modified polyethylene based polymer. In the case of tie layers between nylon and a heat seal layer based on a lower density polyethylene alone or combined with EVA, it is preferred to use maleic anhydride modified polyethylene based copolymer which is mostly ethylene, especially one with a low modulus. Particularly preferred tie layers for such an application are those based on the anhydride modified polyethylene copolymers disclosed in U.S. Pat. No. 4,900,612, incorporated by reference herein. Especially preferred are Equistar® PX 3080 anhydride modified linear low density polyethylene resin having a melt index of 1.8 g/10 min., and a density of 0.910 g/cm$^3$ which is supplied by Equistar Chemicals, LP, Houston, Tex.; DuPont Bynel® 41E710 anhydride modified linear low density polyethylene resin having a melt index of 2.7 g/10 min, a density of 0.91 g/cm$^3$, a melting point of 115° C. and DuPont Bynel® 21E787 anhydride modified ethylene acrylate resin having a melt index of 1.6 g/10 min., a density of 0.93 g/cm$^3$, a melting point of 92° C.; DuPont Bynel® 4164 anhydride modified linear low density polyethylene resin having a melt index of 1.3 g/10 min., a density of 0.93 g/cm$^3$ and a melting point of 127° C., all of which are supplied by E. I. du Pont de Nemours and Company, Wilmington, Del.; Mitsui ADMER® SF755A elastomer Based Adhesive Resin, having a melt index of 2.6 g/10 min a density of 0.89 g/cm$^3$ which is supplied by Mitsui Chemicals America, Inc., Rye Brook, N.Y.; Westlake Tymax™ GT7058 anhydride modified acrylate copolymer resin having a melt index of 2.70 g/10 min, a density of 0.943 g/cm$^3$, and a melting point of 74° C., Westlake TYMAX™ GT4300 anhydride modified linear low density polyethylene resin having a melt index of 8.0 g/10 min., a density of 0.918 g/cm$^3$ and a melting point of 121° C., both of which are supplied by Westlake Chemical Corporation, Houston, Tex.; Dow AMPLIFY™ GR 216 anhydride modified polyolefin elastomer resin having a melt index of 1.3 g/10 min, a density of 0.875 g/cm$^3$, and a melting point of 62.8° C. which is supplied by Dow Chemical Company, Midland, Mich.

In the preferred construction in which the tie layer adjacent to the heat seal layer is contaminated to render it frangible, it is preferable to strike a balance so that its adhesion to the heat seal layer is low enough to facilitate manual peeling for easy opening but is sufficiently high enough to avoid skinning or webbing. It is believed that skinning or webbing will be observed if the adhesion of the tie layer is too low to reliably cause a fracture of the heat seal layer. If the adhesion is too low to cause a clean failure in the heat seal layer, on peeling the film may simply delaminate leaving a membrane of the seal layer in place (skinning) or pieces of the heat seal layer by be left behind (webbing).

In the preferred constructions, the frangible film of the present invention comprises a frangible tie layer. It is preferred that the frangible film include a frangible tie layer such that the frangible film has a propagation peel strength of between 150 grams/inch and 900 grams/inch, between 300 grams/inch and 900 grams/inch, between 500 grams/inch and 900 grams/inch, or between 700 grams/inch and 900 grams/inch.

It is preferred to use a tie layer which directs the fracture caused by peeling to be adjacent to or at the interface with the heat sealable layer. This is believed to minimize or eliminate the occurrence of skinning or webbing upon opening of the sealed package. One approach is to utilize a tie resin with a strong affinity for the next interior layer and to contaminate it with an additive which reduces its affinity with the heat sealable layer. In the case of the preferred structure with a nylon interior layer and a polyethylene based heat sealable layer, a preferable approach is to use an anhydride modified copolymer of ethylene with butene-1 and to contaminate it with a polymer of mainly butene-1. This contamination is believed to reduce the adhesion to the nylon layer without having as great an effect on the adhesion to the heat sealable layer.

It is also important that the frangible layer, whether a feature of the heat seal layer or located adjacent to the heat seal layer, have sufficient strength to survive heat shrinking onto the contents of the sealed package. Typically for appearance purposes, the cavity for accommodating the item or items to be packaged is designed to cause the heat seal between the first film and the second film to be immediately adjacent to these items. This means that as the film is heat shrunk the heat seal will be subjected to particularly high stresses. Such stresses can be sustained without failure of the package by a careful adjustment of the frangible layer to be in an appropriate window of strength.

In addition, an inner heat seal between the first and second films which lies inside but adjacent to the outer heat seal and follows the perimeter of the outer heat seal is preferred. It is believed that upon heat shrinking this inner heat seal can absorb some of the shrinking stresses and protect the outer heat seal from failure. Such a seal is readily provided by using a seal bar which carries two beads, one within the other. In order to give the sealed package an optimum appearance, the outside seal should be located fairly close to the packaged items, which then requires that this inner heat seal be located fairly close to the outer one. It is particularly preferred that the inner bead on the heat seal bar be spaced less than about 5 mm from the outer bead. Because the outer heat seal provides a hermetic seal to the package, it is not necessary that the inner heat seal be continuous. However, it is convenient and preferred that it be continuous.

The sealed package is provided with two heat set tabs, one formed in each of the first and second films such that the one formed in the top film lies under and is essentially coincident with the one formed in the second film. The aim is to provide two graspable tabs which can be used to pull the first film away from the second film thereby peeling open the heat seals and allowing access to the items packaged in the sealed package. It is desirable that these tabs not undergo any significant shrinking when the sealed package is subjected to heat shrinking conditions and consequently during the formation of the sealed package they are subjected to elevated temperatures while being constrained from shrinking. This can conveniently be done by bringing a heated platen in contact with the areas of the films destined to form the tabs at the same time as the two films are heat sealed together. In the typical apparatus the edges of the films are held by clips so these areas can not shrink in the transverse direction and, at this point in manufacture, the these areas are still part of a continuous web so that they cannot shrink in the machine direction. However, it is necessary to take some step to prevent the two facing surfaces of these areas from adhering to each other in view of the fact that they each carry the heat sealable layer of their film. One or both of these surfaces may be treated to render it non-adherent, some material may be placed between these surfaces such as a piece of Teflon tape or the platen temperature may be constrained to be high enough to effect the relaxation of shrinking stresses but too low to effect any significant adhesion. It is preferred to print one of these surfaces with an ink, although a label material conventional in the industry may also be applied. It is particularly preferred to pre-print the first film with an adhesion preventing ink in the appropriate areas before feeding the roll stock of such film to the package forming apparatus. Printing of the first film is preferred because it is typically easier to ensure that the printed areas are in registry with the areas destined to become the graspable tabs on the first film than it is to obtain registry with the second film. The ink may be any of those typically used to impart graphics to such flexible packaging film. It is just necessary to apply a sufficient thickness and this is readily determined by simple trial.

The open mouth of typical mold used on this cavity forming apparatus has a generally rectilinear shape which makes it convenient to form the tabs on one of the corners of this shape. In fact, it is common for these corners to have a radius which fits within the right angle which would be formed by simply extending the adjacent sides until they intersected. It is particularly convenient to utilize the area between these right angles and these radii for the formation of the tabs.

It is preferred to provide a stress concentrator or peel initiator at the point where the tabs abut the outer heat seal. The stress concentrator may be any feature which facilitates a fracture through the heat seals when the two graspable tabs are pulled away from each other in a direction generally perpendicular to the plane of the heat seals. US Published Patent Application 2010-0270330, incorporated by reference herein, discloses angular features which are suitable as peel initiators. A particularly preferred stress concentrator is a chevron or triangle with its apex directed way from the heat seal bead and its base adjacent to this bead. This stress concentrator is conveniently made by adding an appropriate profile to the heat seal bead which forms the outer heat seal. For instance a triangular shape could be added to this bead at one of its radiused corners. Alternatively a stress concentrator could be made by providing an unprotected shape on coinciding areas of the facing surfaces of the two tabs and using a sufficiently high heat set temperature. These two unprotected areas would then adhere together to provide a feature of the appropriate shape. For instance, the unprotected shape could be a triangle with its base aligned to be adjacent to the outer heat seal.

The sealed package of the present invention may be generally made in accordance with the teachings of U.S. Pat. No. 7,487,652, incorporated by reference herein, with the addition of forming the graspable heat set tabs and, in the preferred embodiments, the stress concentrator and the inner heat seal. Another deviation from the conventional practice is, of course, the use of a film with a frangible layer. After heat sealing the first and second films together, cutting this sealed portion from the webs of the two films and heat shrinking the sealed package about the packaged items by the application of elevated temperatures, a final package is obtained which is hermetically sealed and stable to normal shipping and handling but which can be readily opened by the average person without the aid of any tool. He just needs to manually pull the two graspable tabs away from each other in a direction generally perpendicular to the plane of the heat seals.

The sealed readily openable heat shrunk package of the present invention may be used for the packaging of items which benefit from being contained in form fitting hermetically sealed packages. In those cases in which the films are multilayer and contain an oxygen barrier, these packages are particularly advantageous for items of perishable food items whose shelf life is enhanced by isolation from the atmosphere and for whom there is a desire by consumers to view the packaged items. Such thermoformed heat shrunk packages of the present invention are particularly useful for meat and cheese.

WORKING EXAMPLES

Example 1

A readily manually opened shrink wrapped package of a 32 ounce turkey ham was made with an apparatus described in U.S. Pat. No. 7,487,625 modified to produce two aligned heat set tabs on the upper and lower films used to form the package. Roll stock of a transparent thermoplastic seven layer nylon based oxygen barrier heat sealable 428 mm wide shrink film was fed to the apparatus. The film had been made by a double bubble process and displayed shrink performance of about 45% machine direction (MD) and 50% transverse direction (TD) at 90° C. One exterior layer was a heat sealable mixture of a very low density polyethylene (VLDPE) with a density of 0.91 g/cm$^3$ and a melt flow of 0.6 with a metallocene catalyzed linear low density polyethylene (mLLDPE) with a density of 0.9 g/cm$^3$ and a melt flow of 7.5 and the other exterior layer was a mixture of crystalline and amorphous nylons (crystalline resins with relative viscosities (RV) of about 3.6 and about 1.8 and an amorphous resin with an intrinsic viscosity (IV) of about 0.82). The core layer was ethylene vinyl alcohol (EVOH).

This roll stock was passed over the top of two side by side molds spaced apart 22 mm, each approximately 140 mm long by 175 mm wide in the transfer direction of the web (the machine direction or MD) with a depth of about 75 mm with the heat sealable exterior layer facing up away from the mouth of the mold, heated to 85° C. for 1.5 seconds and stretched into the mold by the application of a vacuum. The open mouths of the molds were provided with a gasket which aided in maintaining the vacuum which was applied from below. The edges of the web of roll stock were held by chain mounted clips as is conventional in the operation of this apparatus. The chain carrying the clips advanced with the web in the machine direction.

The mold was then moved downward so that the web, now carrying two open mouth cavities about 75 mm deep, could advance about 250 mm. A 32 ounce turkey ham was then placed into each cavity and the web was advanced another 250 mm.

A web of roll stock of a second transparent thermoplastic seven layer nylon based oxygen barrier heat sealable 428 mm wide shrink film was passed over the open mouths of the cavities with its heat sealable exterior layer facing toward the cavities. This film was essentially identical in structure and manufacture to that of the first film and had essentially the same properties with two exceptions. The tie layer which was adjacent to the heat sealable exterior layer and made up about 31.4 wt % of the film structure was a copolymer of ethylene modified with maleic anhydride, contaminated with about 30 wt % of a copolymer of 1-butene to render this layer frangible and cause the film to have a reduced initial peak peel strength of 2700 g/inch determined in accordance with ASTM F88 when heat sealed at 300° F. for 1 second at 30 psi. In addition, the heat sealable exterior layer was a mixture of the same VLDPE (density of 0.910 g/cm$^3$ and melt index 0.6) as used in the first film and ethylene vinyl acetate (EVA) with a vinyl acetate content of 5%, a density of 0.927 g/cm$^3$ and a melt index of 1.5 g/10 min.

The second film was then heat sealed to the first film with seal bars which followed the outline of the open mouths of the cavities but were spaced outward from the mouths so as to act on a perimeter of flat first film which extended out from the mouths 75 mm. The seal bars each had a double bead profile with the inner bead being spaced about 2.5 mm inside the outer bead. Each of the corners of the molds had a 30 mm radius and so the seal bars had similar radii. This left a roughly triangular shaped area extending out from the heat seal at each corner which fell within the rectangle defined by the sides and edges of each mold (The apex of each triangle being a corner of this rectangle and the base being the radius in the heat seal at that corner). Heat was brought to bear on one of these triangular areas for each cavity causing it to heat set. The seal bars were heated to 135° C. and pressed into the film with a pressure of 5 bars. The heat set areas were heat set using about the same temperature. Before the heat seal and heat set operations, a small piece of Teflon tape was inserted between the first and second film in each of the areas which were to be heat set to inhibit them from adhering to each other as a result of the heat set treatment. A small chevron was cut out of each piece of tape so that its apex faced away from the cavity and its base would be immediately adjacent to the heat seal upon the formation of the heat seal. Upon heat sealing and heat setting a chevron shaped feature was formed in which the first and second films were adhered together. The first and second films lightly tacked together in the triangular areas, probably due to imperfect placement of the Teflon tape (Some portion of the first and second films were probably permitted to directly contact in these areas) but they were easily separated to provide two graspable tabs for each het set area.

A rectangle was then cut out of the webs of the first and second films around each sealed package, which rectangle had sides adjacent to the outer heat seal except where the heat seal had a radius. This yielded isolated packages, each of which had a triangular piece of separate first and second film at each corner projecting out from the heat seal in the plane of the heat seal.

Each isolated sealed package was then subjected to a heat shrink procedure. Each isolated package was carried by a conveyor belt into a heat shrink tunnel where it was subjected to between 85° C. and 95° C. for between 3 and 5 seconds. This caused the first and second films to shrink against and for fit to the contained 32 ounce turkey ham. The triangular pieces which had not been heat set shrunk away so as not be readily apparent. However, the heat set triangular pieces remained, with each providing two readily graspable tabs after fracturing the light tacking between them which is described above.

The process was repeated a number of times to yield a number of sealed heat shrunk packages.

The sealed heat shrunk packages were still hermetically sealed but in a number of cases it was apparent that the inner heat seal had been opened by the stresses which arose as the first and second film shrunk against the contents of the package.

The two tabs of a given heat shrunk sealed package were grasped and pulled away from each other in a direction generally perpendicular to the plane of the major surface of the tabs. The heat seals of the package were readily peeled apart just using a comfortable amount of manual force, thus opening the package and providing easy access to its contents. The fracture occurred cleanly adjacent to the heat seal layer of the second film so the package was opened without skinning or webbing. The same result was obtained for a number of packages.

Example 2

Example 1 was essentially repeated with the following exceptions. The second film in this example had its exterior heat sealable layer contaminated with 25 wt % of the same butane-1 contaminate as was used in the adjacent layer of the second film in Example 1 and this heat sealable layer was based on the mixture of VLDPE and mLLDPE as was used in the heat sealable layer of the first film and did not include any EVA. The layer adjacent to this layer was not contaminated and had the same make up as this adjacent layer in the first film. The peel strength of this film in a standard test was 3300 g/inch.

The areas of the first film which would later form one of the graspable tabs on each of the sealed packages were covered with magic marker to inhibit its adhering to the corresponding portions of the second film. This was entirely successful in preventing such adhesion. This meant, however, that there was no stress concentrator at the juncture between the graspable tabs and the first heat seal.

A series of heat seal temperatures from 125° C. to 155° C. in 10 increments were used and of the four only the 155° C. heat seal temperature failed to give a heat seal which could be easily peeled.

Example 3

Example 1 was essentially repeated except that the areas of the first film which would later form one of the graspable tabs on each of the sealed packages were covered with ink in a first run and with a label in a second run. In both runs adhesion to the corresponding portions of the second film was entirely prevented.

The above disclosure is for the purpose of illustrating the present invention and should not be interpreted as limiting the present invention to the particular embodiments described but rather the scope of the present invention should only be limited by the claims which follow and should include those modifications of what is described which would be readily apparent to one skilled in the art.

What is claimed is:

1. A manually openable heat shrunk package comprising:
a first flexible heat shrinkable film;
a second flexible heat shrinkable film;
a hermetic seal comprising a perimeter heat seal formed by heat sealing a portion of said second flexible heat shrinkable film to a portion of said first flexible heat shrinkable film; wherein only one of said films is readily frangible and renders said heat seal manually peelable;
a heat set tab on each of said two flexible heat shrinkable films which are aligned with each other; wherein each of said tabs has a sufficient surface area facing the other tab but not adhered to it to render said tab readily manually graspable; wherein a portion of each of said tabs immediately adjacent to said heat seal is adhered to the other and said adhered portion includes a feature which concentrates stress on said heat seal when said tabs are pulled away from each other in a direction generally perpendicular to the plane of the heat seal; wherein said graspable tabs are adapted to pull away from each other such that said readily frangible film cleanly peels apart from itself to rupture said heat seal and open said package.

2. The package of claim 1 wherein said feature is a chevron with its point oriented away from said heat seal.

3. The package of claim 1 wherein said hermetic seal further comprises a second heat seal formed adjacent to and entirely surrounded by said perimeter heat seal;
wherein said graspable tabs are adapted to pull away from each other such that said readily frangible film cleanly peels apart from itself to rupture said perimeter heat seal and said second heat seal, and open said package.

4. The package of claim 1 wherein both of said flexible films are multilayer with the outer most layer of each adapted to be readily heat sealable.

5. The package of claim 1 wherein said frangible film includes a frangible layer.

6. The package of claim 5 wherein said frangible film further includes a heat sealable layer.

7. The package of claim 6 wherein said frangible layer is immediately adjacent to said heat sealable layer.

8. The package of claim 7 wherein the composition of said frangible layer is adjusted such that it fractures adjacent to or at the interface with said heat sealable layer upon said package being opened.

9. The package of claim 6 wherein said frangible layer lies between said heat sealable layer and a nylon layer and has a greater adhesion to said heat sealable layer than to said nylon layer.

10. The package of claim 9 wherein said frangible layer is based on an anhydride modified copolymer of ethylene which has been contaminated with a polymer of butene-1 to reduce its adherence to said nylon layer.

11. The package of claim 5 wherein said readily frangible layer is rendered readily frangible by containing a polymer which is incompatible with the polymer which provides the structure of said readily frangible layer.

12. The package of claim 5 wherein said frangible layer is a tie layer.

13. The package of claim 1 wherein said frangible film has an initial peak peel strength in a standard ASTM F88 test using 300° F. at 30 psi for one second is less than about 3200 g/inch.

14. The package of claim 13 wherein said initial peak peel strength is between about 2400 and 3200 g/inch.

15. The package of claim 1 wherein said frangible film has a propagation peel strength of between 150 grams/inch and 900 grams/inch.

16. The package of claim 15 wherein said propagation peel strength is between 300 grams/inch and 900 grams/inch.

17. The package of claim 16 wherein said propagation peel strength is between 500 grams/inch and 900 grams/inch.

18. The package of claim 17 wherein said propagation peel strength is between 700 grams/inch and 900 grams/inch.

19. The package of claim 1 wherein both of said flexible films are multilayer having an outer most heat sealable layer and at least one of said heat sealable layers carries a printed area over a portion thereof which forms one of said heat set tab.

20. The package of claim 19 wherein said printed area is sufficient to prevent said area from adhering to the other flexible film when said heat set tab is formed by applying heat to said portion while it is in a face to face relationship with the other flexible film.

* * * * *

UNITED STATES PATENT AND TRADEMARK OFFICE
CERTIFICATE OF CORRECTION

PATENT NO. : 8,397,914 B1
APPLICATION NO. : 13/649718
DATED : March 19, 2013
INVENTOR(S) : Daniel Frank Janichek et al.

It is certified that error appears in the above-identified patent and that said Letters Patent is hereby corrected as shown below:

In the Specification

In column 2, line 20, delete "hest" and insert -- heat --, therefor.

In column 2, line 52, delete "container" and insert -- container 10 --, therefor.

In column 5, line 6, delete "min" and insert -- min., --, therefor.

In column 5, line 9, delete "min," and insert -- min., --, therefor.

In column 8, line 43, delete "75 mm." and insert -- 7.5 mm. --, therefor.

Signed and Sealed this
Thirtieth Day of June, 2015

Michelle K. Lee
*Director of the United States Patent and Trademark Office*